Patented May 14, 1935

2,001,380

UNITED STATES PATENT OFFICE 2,001,380

SALTS OF KETO AROMATIC ACIDS

Lloyd C. Daniels, Crafton, and Alphons O. Jaeger, Mount Lebanon, Pa., assignors, by mesne assignments, to American Cyanamid & Chemical Corporation, a corporation of Delaware No Drawing. Application December 9, 1930, Serial No. 501,073

1 Claim. (Cl. 260—11)

This invention relates to salts of keto aromatic acids in which the metal is present in a form in which it has a valence of three or more. Any metallic element which, in its trivalent or higher form, is sufficiently basic to form a salt of a keto aromatic acid, or of a mixture of such acids, or of one or more keto aromatic acids in admixture with another acid, may be used in preparing the salts of the present invention. Bivalent salts of such metals as manganese, iron and cobalt are not included in the scope of the present application as these form the subject matter of our co-pending application Serial No. 501,074 of even date herewith. The manganic, ferric and cobaltic salts of keto aromatic acid substances, however, are included among the other salts of metals of higher valence in the present application.

Almost all the keto aromatic acid salts which form the subject matter of the present invention exist in a non-crystalline form, most of them being insoluble or only slightly soluble in water although certain exceptions may occur, notably the ferric salts of benzoyl benzoic acid. When heated to above 80° C. many of them appear to undergo a change indicating the possibility of an allotropic form, and a gummy residue results which is in most cases readily soluble in the common organic solvents, giving a lacquer-like film on drying. In general they exhibit no sharp melting points, but at elevated temperatures become soft and more or less plastic; further heating usually results in decomposition of the products.

At present the most important commercial use of the salts of the present invention appears to lie in the field of plastics and coating compositions, where the ready solubility in organic solvents which many of them exhibit naturally and most of them after the heat treatment above referred to and where the characteristic which they all possess of forming hard and tough films on evaporation of such solvents makes them particularly useful. Another important advantage of these salts lies in the fact that they present a ready means for obtaining metals of the valence of three or higher in the form of a compound which is soluble in organic solvents, a possibility that has heretofore existed very rarely in the case of solvents of low polarity and is not at all common even with such comparatively good solvents for inorganic substances as alcohol and the like.

The salts of the present invention may be prepared by reacting aqueous solutions of the desired metal in the form of a compound in which it exhibits a valence of three or more, such as the nitrate, sulfate, chloride, carbonate, or other salt, with keto aromatic acids, either singly or in admixture, or with admixtures of keto aromatic acids with other acids such as stearic, lactic, phthalic, resin acids and the like, in case an unmixed keto aromatic acid compound is not desired. In most cases it is preferable to carry out the reaction using the ammonium or alkali metal salts of the organic acids, which can be readily prepared by dissolving the free acid in a suitable solution of the alkali.

The keto acids have the formula

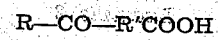

R—CO—R'COOH wherein either R or R' or both R and R' may be aromatic nuclei. Examples of such compounds falling under the definition of "keto-aromatic acids" are aceto-benzoic acid, benzoyl propionic acid, benzoyl benzoic acid and the like as well as hydrogenation and substitution products such as tetrahydrobenzoyl benzoic, chlorbenzoyl benzoic, etc.

Since the metals which are used to form the salts of the present invention are of a valence of three or higher, it is possible to form further series of compounds in addition to those resulting from the reaction of a single metal compound with a single keto aromatic acid. For example, mixtures of the various keto aromatic acids or of their ammonium or alkali metal salts can be prepared and reacted with a single salt of the desired metal, or the keto aromatic acid may be so reacted in admixture with other acids or salts such as stearic, lactic, resin acids, acid resins and the like. It is quite possible that in some cases only unstable compounds may result from the simultaneous reaction of different organic acid substances or even mixtures of the non-alkali forming metal salts of the acids may be obtained, but as the chief use of the products is in solution or within the confines of a resin of high molecular weight the net result is the same. The invention is not limited to reaction products of a single organic acid compound with a single metal, but includes products obtained by the reaction of any metal compound in which the metal has a valence of three or more with mixtures of different keto aromatic acids or with mixtures containing one or more keto aromatic acids and an acid of another type.

At present the chief use of the keto aromatic acid salts lies in the preparation of plastic compositions, as described in the prior application of L. C. Daniels No. 476,715, filed August 20, 1930, but the present invention is not limited to any use to which the new products may be put.

The preparation and use of representative salts of the present invention will be described more specifically in the following examples, but the invention is not limited thereto.

Example 1

Benzoyl benzoic acid is prepared by mixing 200 parts of phthalic anhydride, 380 parts aluminum chloride and 792 parts benzol at low temperatures, raising the temperature to 40-45° C., heating at this point for one hour, and refluxing for an additional hour. The product is poured into a solution of 280 parts of $Na_2CO_3$, excess benzol removed by steam distillation, and the free acid liberated with dilute hydrochloric acid.

The purified acid so obtained is treated with sufficient dilute ammonia to form the ammonium salt, after which the aluminum salt is prepared by adding equivalent amounts of a solution of aluminum chloride. The product so obtained is separated on a filter, washed, and dried, and after solution in organic solvents is suitable for the preparation of an orange red lake with Alizarin brown dye. This lake can be used in the preparation of colored plastic and coating compositions as described in our co-pending application Serial No. 503,855 filed December 20, 1930.

Example 2

The chromic salt of alphanaphthoylbenzoic acid is prepared by adding equivalent amounts of a solution of $CrCl_3.6H_2O$ to a solution of the ammonium salt of alphanaphthoylbenzoic acid, prepared in the usual manner. The product is washed and dried and forms, after solution in an organic solvent, an excellent compound for the preparation of color lakes of such dyes as Anthracene brown, Alizarin Bordeaux R, Alizarin maroon and the like.

Example 3

Benzoylpropionic acid is prepared by the reaction of 140.5 parts by weight of benzol, 53.4 parts aluminum chloride, and 20 parts of succinic anhydride, the reagents being brought into intimate admixture at temperatures below 15° C. and heated at 50° C. during 2-3 hours. The product is poured into dilute ammonia, the excess benzol distilled off with steam, the free acid liberated and purified, and the ammonium salt is again formed by the addition of equivalent amounts of dilute ammonium hydroxide solution.

The product so produced is treated with solutions of ferric chloride, stannic chloride, cobaltic chloride or other soluble salts of trivalent metals to produce the corresponding salt of benzoylpropionic acid, which can be dissolved in organic solvents and used for the preparing of films, with or without plasticizers.

In the foregoing examples the preparation of keto aromatic acid salts of representative trivalent and tetravalent metals has been described, but it is to be understood that the invention is not limited to the specific salts produced. On the contrary, salts of many other metals, such as antimony, gold, titanium, platinum, molybdenum, cerium, iridium, uranium and manganese can be prepared by similar methods and are included in the present invention.

What is claimed as new is:

Salts of ketoaromatic acids having the formula

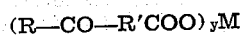

$$(R-CO-R'COO)_yM$$

in which R is an aromatic and R' is an aliphatic radical, and M is any salt-forming metal having a valence of 3 or higher, and $y$ is a number corresponding to the valence of the metal.

LLOYD C. DANIELS.
ALPHONS O. JAEGER.